US009235643B2

(12) United States Patent
Allawi et al.

(10) Patent No.: US 9,235,643 B2
(45) Date of Patent: Jan. 12, 2016

(54) METHOD AND SYSTEM FOR GENERATING SEARCH RESULTS FROM A USER-SELECTED AREA

(71) Applicant: Diwan Software Limited, London (GB)

(72) Inventors: Adil Allawi, London (GB); Ahmed Kharrufa, Gossford (GB)

(73) Assignee: Diwan Software Limited (GB)

( * ) Notice: Subject to any disclaimer, the term of this patent is extended or adjusted under 35 U.S.C. 154(b) by 457 days.

(21) Appl. No.: 13/682,923

(22) Filed: Nov. 21, 2012

(65) Prior Publication Data

US 2014/0143224 A1  May 22, 2014

(51) Int. Cl.
*G06F 17/30* (2006.01)
(52) U.S. Cl.
CPC .... *G06F 17/30864* (2013.01); *G06F 17/30663* (2013.01)
(58) Field of Classification Search
None
See application file for complete search history.

(56) References Cited

U.S. PATENT DOCUMENTS

| 6,327,590 | B1 * | 12/2001 | Chidlovskii | G06F 17/30867 707/734 |
| 2001/0016067 | A1 * | 8/2001 | Evans | 382/176 |
| 2006/0242130 | A1 * | 10/2006 | Sadri et al. | 707/3 |
| 2007/0112764 | A1 | 5/2007 | Yih et al. | |
| 2007/0288433 | A1 * | 12/2007 | Gupta | G06F 17/3053 |
| 2008/0140644 | A1 * | 6/2008 | Franks | G06F 17/30817 |
| 2010/0082570 | A1 * | 4/2010 | Altaf et al. | 707/706 |
| 2011/0218018 | A1 * | 9/2011 | Phillips et al. | 455/556.1 |
| 2011/0252023 | A1 * | 10/2011 | Santamaria et al. | 707/723 |
| 2012/0197857 | A1 * | 8/2012 | Huang et al. | 707/706 |
| 2012/0288203 | A1 | 11/2012 | Pan et al. | |
| 2013/0238651 | A1 * | 9/2013 | Benedek et al. | 707/769 |

OTHER PUBLICATIONS

"Selection Search: Free Extension for Google Chrome to Search for Selected Text in Webpages", Aug. 11, 2011, pp. 1-3, retrived from the Internet: http://web.archive.org/web/20110811062636/http://www.askvg.com/selection-search-free-extension-for-google-chrome-to-search-for-selected-text-in-webpages/ (retrieved on Nov. 20, 2014).

* cited by examiner

*Primary Examiner* — James E Richardson
(74) *Attorney, Agent, or Firm* — Fox Rothschild LLP

(57) ABSTRACT

A method of and device for generating search results from an electronic document. An electronic document includes one or more of an electronic book, a periodical, a multimedia presentation, a text document, one or more images, an electronic mail message, one or more sound clips, or one or more videos. The method includes displaying an electronic document, receiving a user selection of a portion of the electronic document, determining at least one keyword from the user selection of the electronic document, automatically transmitting the at least one keyword to a search engine without additional input by the user, receiving a first results list from the search engine, and outputting a result set along with the electronic document. The result set includes at least the first results list presented as a set of user-selectable links to additional information. The device includes appropriate hardware components for performing the method.

20 Claims, 8 Drawing Sheets

METHOD AND SYSTEM FOR GENERATING SEARCH RESULTS FROM A USER-SELECTED AREA

BACKGROUND

The present disclosure is related to enhancing user interaction with electronic documents. More specifically, the present disclosure is related to a software application including a content browser that includes a search component configured to search for information related to content contained within the electronic document.

Portable computing devices, including devices having software for reading electronic documents, are becoming increasingly common. For example, several major manufacturers manufacture tablet computers that include software applications configured to display electronic documents such as novels, text books, periodicals, and other similar documents.

Typically, viewing an electronic document is a limited interactive experience for a user of the portable computing device. The user may interact with the device to turn pages, zoom in or zoom out, and play sounds or videos embedded in or linked from the document, but otherwise the interaction with the electronic document is non-existent.

The present disclosure is directed to a method and document system designed to enhance user interaction with electronic documents by increasing the potential interaction between the user and the electronic document.

SUMMARY

In one general respect, the embodiments disclose a method of generating search results from an electronic document. The method includes displaying an electronic document, receiving a user selection of a portion of the electronic document, determining at least one keyword from the user selection of the electronic document, automatically transmitting the at least one keyword to a search engine without additional input by the user, receiving a first results list from the search engine, and outputting a result set along with the electronic document. The result set includes at least the first results list presented as a set of user-selectable links to additional information.

In another general respect, the embodiments disclose a device for generating search results from an electronic document. The device includes a processor, a display operably connected to the processor, and a non-transitory computer readable medium operably connected to the processor. The non-transitory computer readable medium contains a set of instructions configured to instruct the processor to display an electronic document on the display, receive a user selection of a portion of the electronic document, determine at least one keyword from the user selection of the electronic document, automatically transmit the at least one keyword to a search engine without additional input by the user, receive a first results list from the search engine, and output a result set along with the electronic document. The result set includes at least the first results list presented as a set of user-selectable links to additional information.

DETAILED DESCRIPTION

Figure 1:
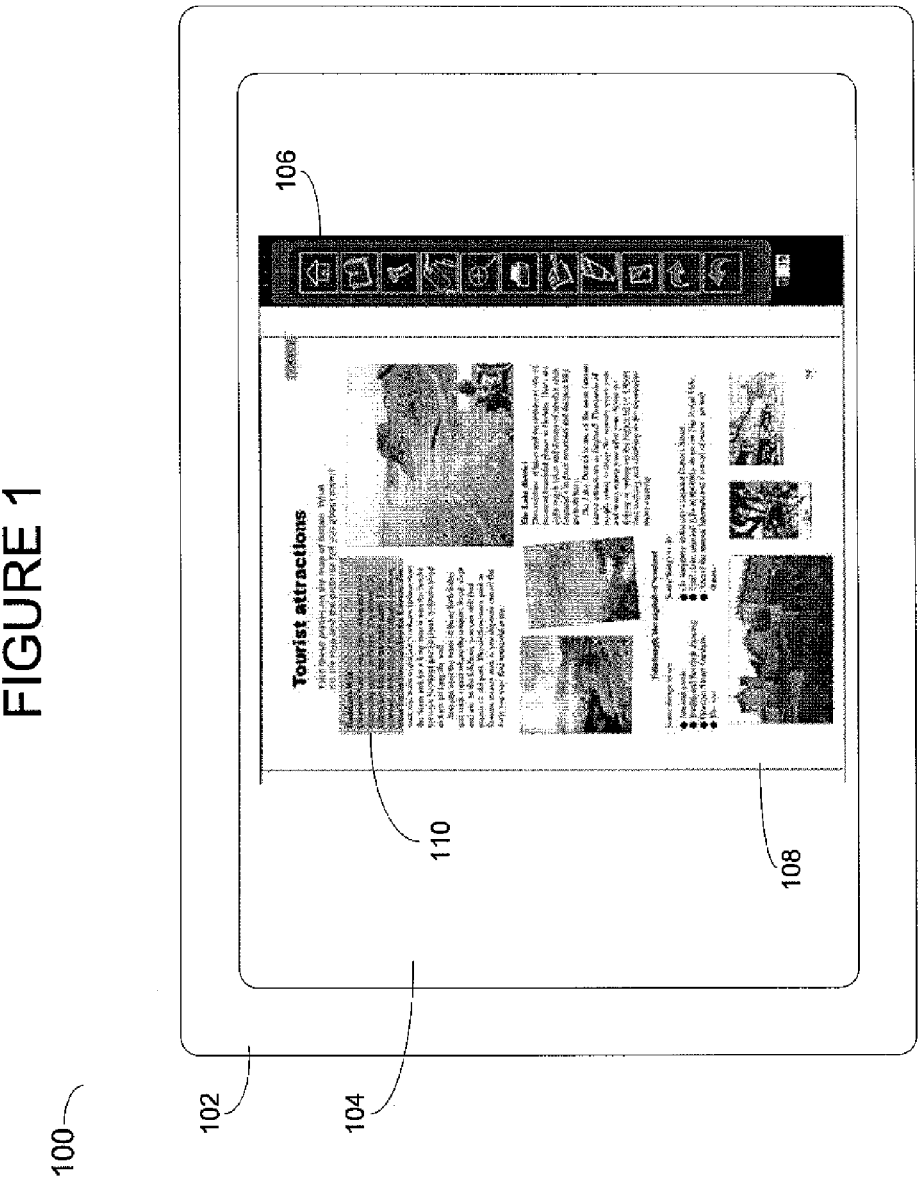
FIG. 1 depicts a portable computing device running a software application displaying an electronic document.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, a "portable computing device" refers to a mobile device that includes a processor and a tangible, computer-readable memory. The memory may contain programming instructions in the form of a software application that, when executed by the processor, causes the device to perform one or more processing operations according to the programming instructions. A typical portable computing device includes a touch sensitive screen, including, but not limited to, resistive touchscreens, capacitive touchscreens, and infrared touchscreens. Examples of suitable devices include portable electronic devices such as tablet devices, smartphones, and the like.

An "electronic document" refers to a digital representation of one or more types of media configured to be displayed by an appropriate software application on a computing device, such as a portable computing device. An electronic document may have a variety of file formats, which may be identified by the technique used to create the electronic document and a file extension of the electronic document. The file format may also determine what type of software application may be used to view the electronic document. For example, formats for a text or image based electronic document may include Adobe® Portable Document Format (PDF), Microsoft®.DOC format, hypertext markup language (HTML), Microsoft® XLS format, tag image file format (TIFF), and other similar file formats that are typically associated with text or image based documents. Formats for a multimedia electronic document (e.g., a sound clip or a video presentation) may include an MPEG-4 audio file (M4A), a Windows® media audio file (WMA), an MPEG-4 video file (MP4), an audio video interleave file (AVI), a Windows® media video file (WMV), and other similar file formats that are typically associated with multimedia documents.

Examples of electronic documents may include, but are not limited to, electronic books (or e-books), periodicals, multimedia presentations, text documents, a collection of one or more images, electronic mail messages, a collection of one or more sound clips, a collection of one or more videos, and other related documents.

A "subject" refers to a topic or topics that an electronic document is about. A subject may be selected from one or more larger contents classifications such as geography, sports, news, entertainment, history, and other similar classifications.

A "keyword" refers to a word that is typically associated with a specific subject for purposes of classifying content. A "keyword phrase" refers to a series of two or more words including at least one keyword.

The present disclosure describes an augmentation of, and enhancement to, a document system for reading an electronic document on a computing device such as a portable computing device. Typically, the user accessible resources of a portable computing device are limited. For example, there is limited display space on a portable computing device. As such, only one application is generally open and accessible at one time. This becomes bothersome to a user when the user wants to perform separate and distinct tasks simultaneously. For example, a user may be reading a newspaper article and want to search for additional information related to the topic of the article. Typically, the user would have to close the software application they are viewing the article in, open another application such as a web browser, and enter their search terms into a searching tool such as an Internet search engine or an online encyclopedia search tool. The present disclosure teaches a document system and method for simplifying this process, by enhancing the software used to view the electronic document to include a searching function accessible to the user while viewing the electronic document.

It should be noted that the various examples as described herein are directed to a portable computing device by way of example only. The teachings of the present disclosure are not merely limited to portable computing devices, and may be applied to various other computing devices such as a desktop computer or computer workstation. Additionally, the teachings of the present disclosure may be applied to computing devices integrated into other products. For example, a computing device provided with an automobile may incorporate the teachings of the present invention so as to provide a driver or passenger of the automobile with a simplified process for obtaining additional information related to an electronic document being accessed by the automobile's computing device, while the automobile is being operated.

Specifically, the present disclosure relates to a document system having a dedicated software application configured to display an indexed electronic document selected from a library of similarly indexed documents. While viewing the electronic document, a user can highlight an area of interest in the electronic document. The document system may parse the user-selected area to determine if any keywords or keyword phrases are contained within the area and, if there is at least one keyword, automatically perform a search of those keywords without further input or action from the user. The document system may then present the user with the option to view the search results within the software application while still viewing the electronic document, thereby providing a single resource for acquiring additional information related to one or more topics contained within the electronic document.

FIG. 1 shows one such example of a portable computing device, generally designated 100. The portable computing device 100 may include a front face 102 and a display 104. The display 104 may be any suitable component for displaying images, including, but not limited to, electroluminescent displays, electronic paper displays, vacuum fluorescent displays, light emitting diode (LED) displays, cathode ray tube (CRT) displays, liquid crystal (LCD) displays, plasma display panels, digital light processing (DLP) displays, and organic light-emitting diode (OLED) displays. The display 104 may further include a touch sensitive screen, including, but not limited to, resistive touchscreens, capacitive touchscreens, and infrared touchscreens. The touchscreen may be configured to function as both a display as well as an input device for receiving various input commands form a user. However, it should be noted that a touchscreen is shown by way of example only, and additional input devices such as a pointer device (e.g., a mouse or trackball), a keyboard, a microphone, an image capturing device, and other similar input devices may be used.

The portable computing device 100 may be configured to run one or more software applications 106 for displaying an electronic document, such as electronic document 108. The electronic document 108 may include text, images, videos, sound, or some combination thereof. As shown in FIG. 1, the electronic document 108 is a combination of text and images related to tourist attractions. The user may select an area 110 of the electronic document that the user expresses interest in or wants to find additional information about. For example, by utilizing the touchscreen characteristics of the display 104, a user of portable computing device 100 may drag their finger against the display to select an area of text 110 on the electronic document 108. The user selected area 110 may change appearance to indicate it has been selected. For example, the area 110 may change color as compared to the rest of the electronic document 108. If the user selects an area 110 including an image or video (not shown in FIG. 1), the appearance of the image or video may be altered as well. For example, the image or video may appear to be grayed out, or a frame or other indicator may be added around the perimeter of the image or video (or the video viewing frame contained within the electronic document).

Figure 2:
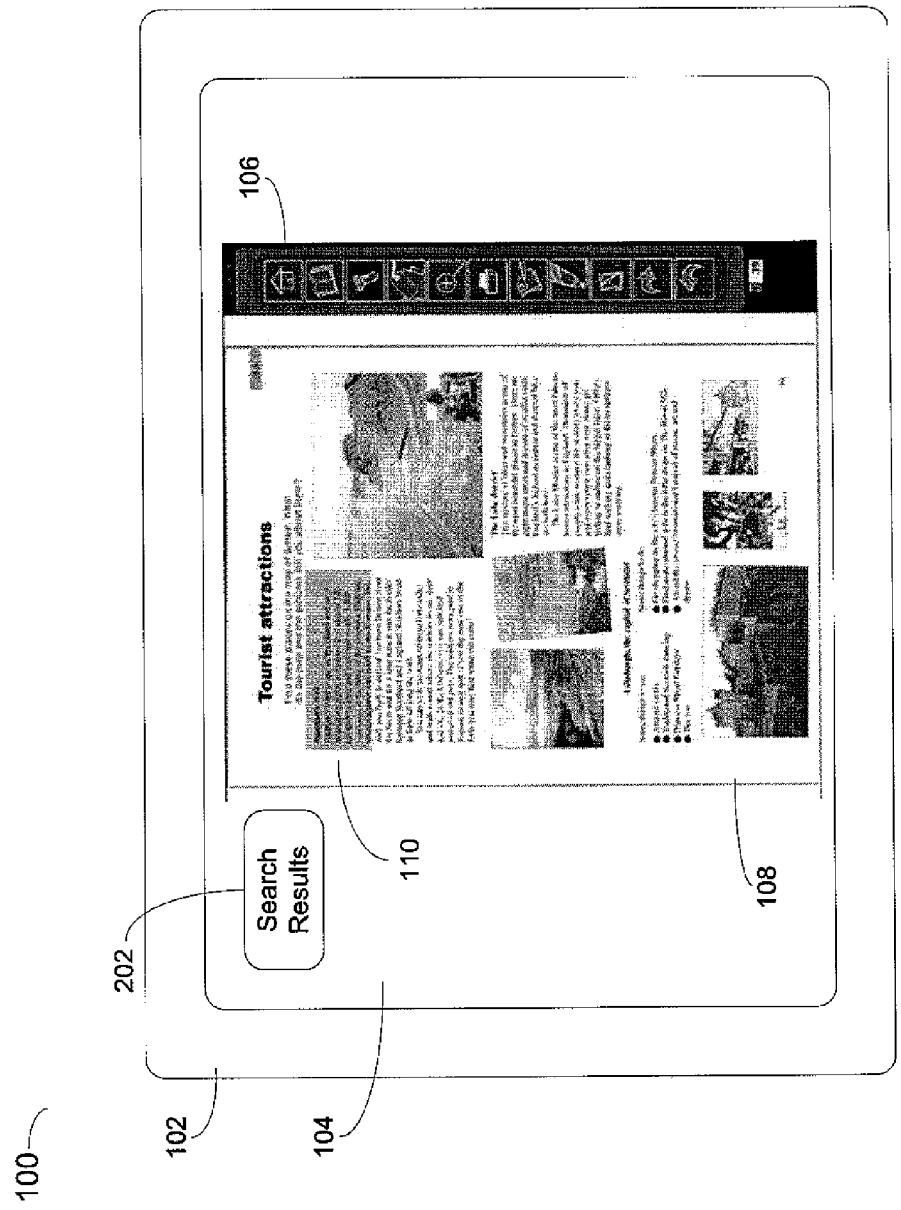
FIG. 2 depicts the portable computing device of FIG. 1 displaying an indication of potential search results related to a user selected area of the electronic document.

As shown in FIG. 2, once the user has selected an area 110, the document system may update the software application 106 to display one or more icons 202 indicating that there may be possible search results related to the selected area 110. If the user selects the icon 202, the document system may retrieve and output the search results via the software application 106. For example, the document system may display the search results as an overlay on or positioned adjacent to the electronic document 108.

Figure 3:
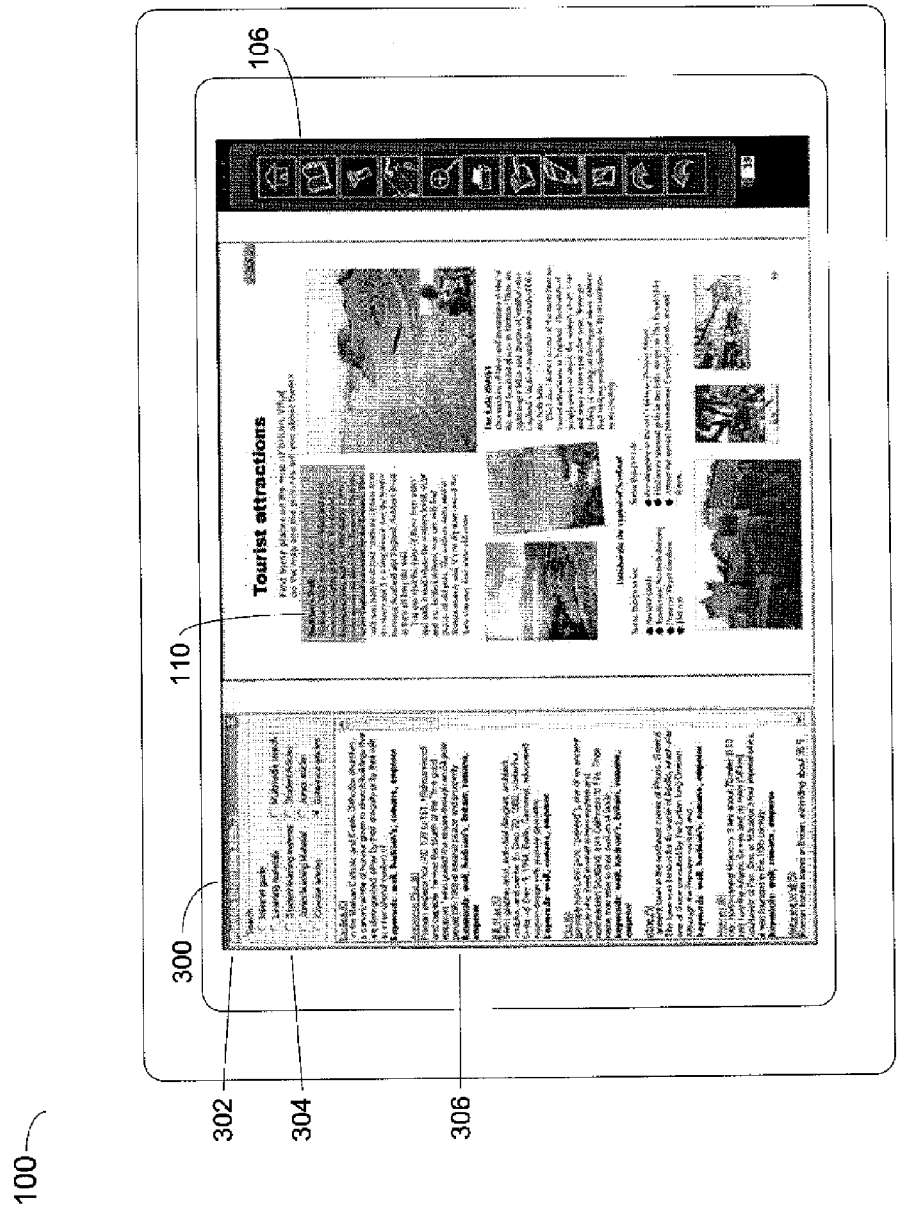
FIG. 3 depicts a portable computing device of FIG. 1, wherein the software application is displaying search results related to a user selected area of the electronic document.

As shown in FIG. 3, if the user selects the icon 202, the document system may update the software application to display a set of search results 300. The search results 300 may include a status bar 302 indicating what percentage of the search has been completed. The search results 300 may also include a search options pane 304 where the user may select which sources to search. For example, the search options pane may allow the user to select from various Internet search engines, various online encyclopedias and related reference sources, university archives, personal document collections, and other similar searchable information repositories.

The search results 300 may further include a result set 306. The result set may include a sorted listing of links or references to websites, articles, documents, multimedia presentations, and other data types related to the user-selected area 110 selected from the original electronic document 108.

Once the document system displays the search results 300 within the software application 106, the document system may continue to execute the search in the background until the search is complete and the status bar 302 indicates 100% of the search is completed. However, during the search, the result set 306 may update, moving more accurate and relevant results to the top of the list, and moving less accurate results down the list. As the user may have to scroll through the result set 306 to see the entire list, only the most relevant results may be displayed to the user initially, thereby increasing the likelihood that the user will initially select a higher quality result.

The document system may provide a set-up interface accessible in the software application 106, in addition to the search options pane 304, such that the user may define their searching preferences. For example, the user may define which search engine and online encyclopedia they want the document system to access to perform the search, as well as the order of preference for returning results. Additionally, the user may provide network addresses for specific document collections such as university archives or personal document collections to search. Alternatively, the software application may include a set of preloaded archives to search.

For example, a university may provide or sells its students an electronic document reader. The students have the option to purchase electronic copies of their text books for viewing on the electronic document reader. The associated document system and software application for viewing the text books may be programmed to search a document archive associated with the university such that students may access additional information related to topics they are studying.

Figure 5:
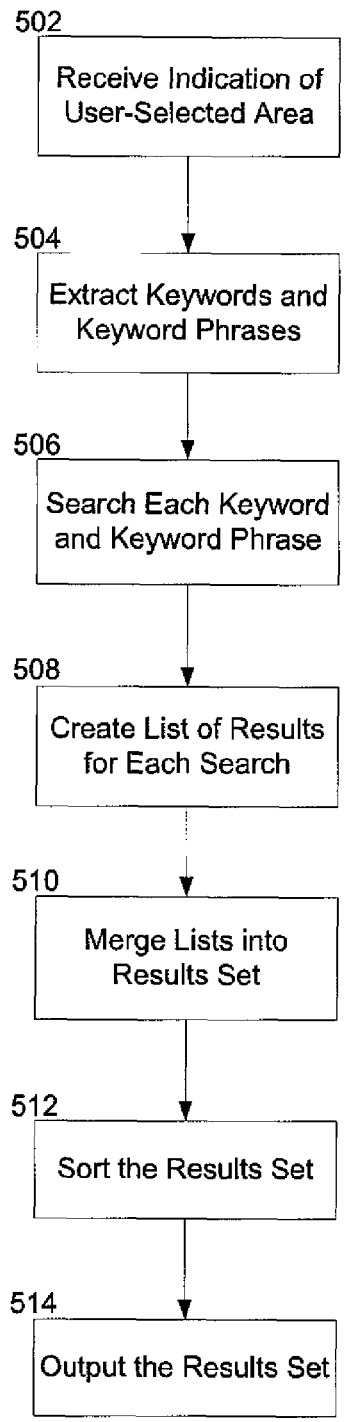
FIG. 5 depicts a flow chart illustrating a process for searching an electronic document according to an embodiment.
Figure 6:
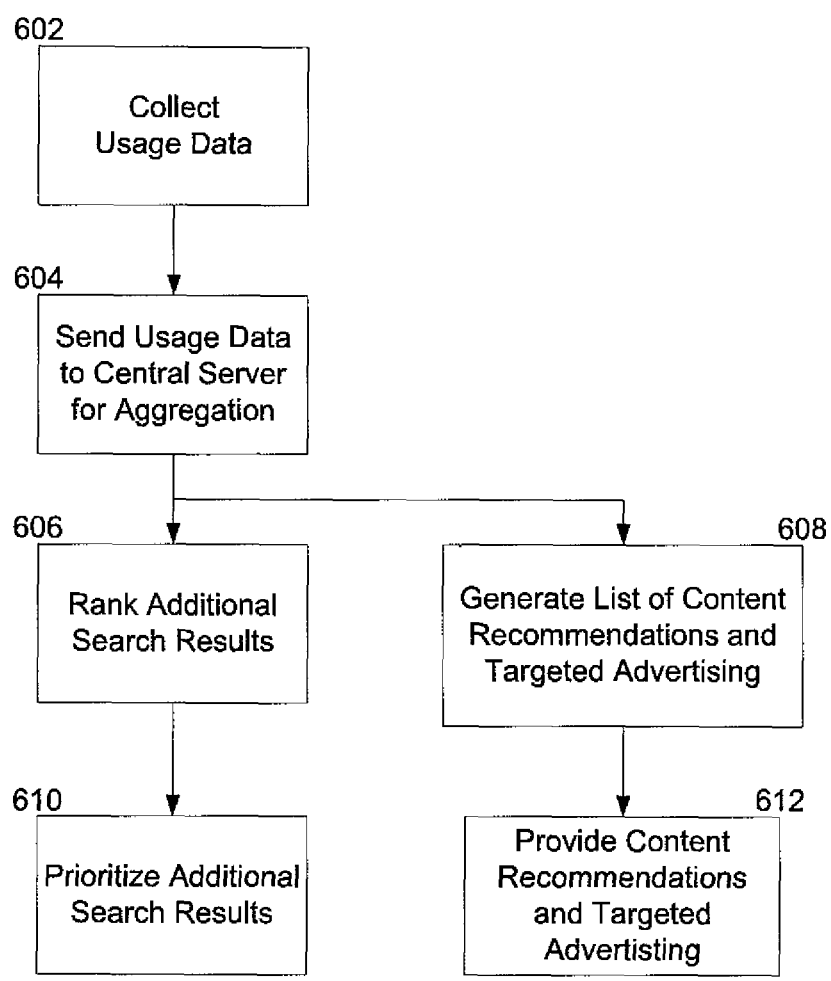
FIG. 6 depicts a flow chart illustrating a process for analyzing user data according to an embodiment.

Specific details of the electronic document searching, as well as details related to extracting keywords from a document and collecting and analyzing usage data is explained in greater detail in the following discussions of FIGS. 4-6.

Figure 4:
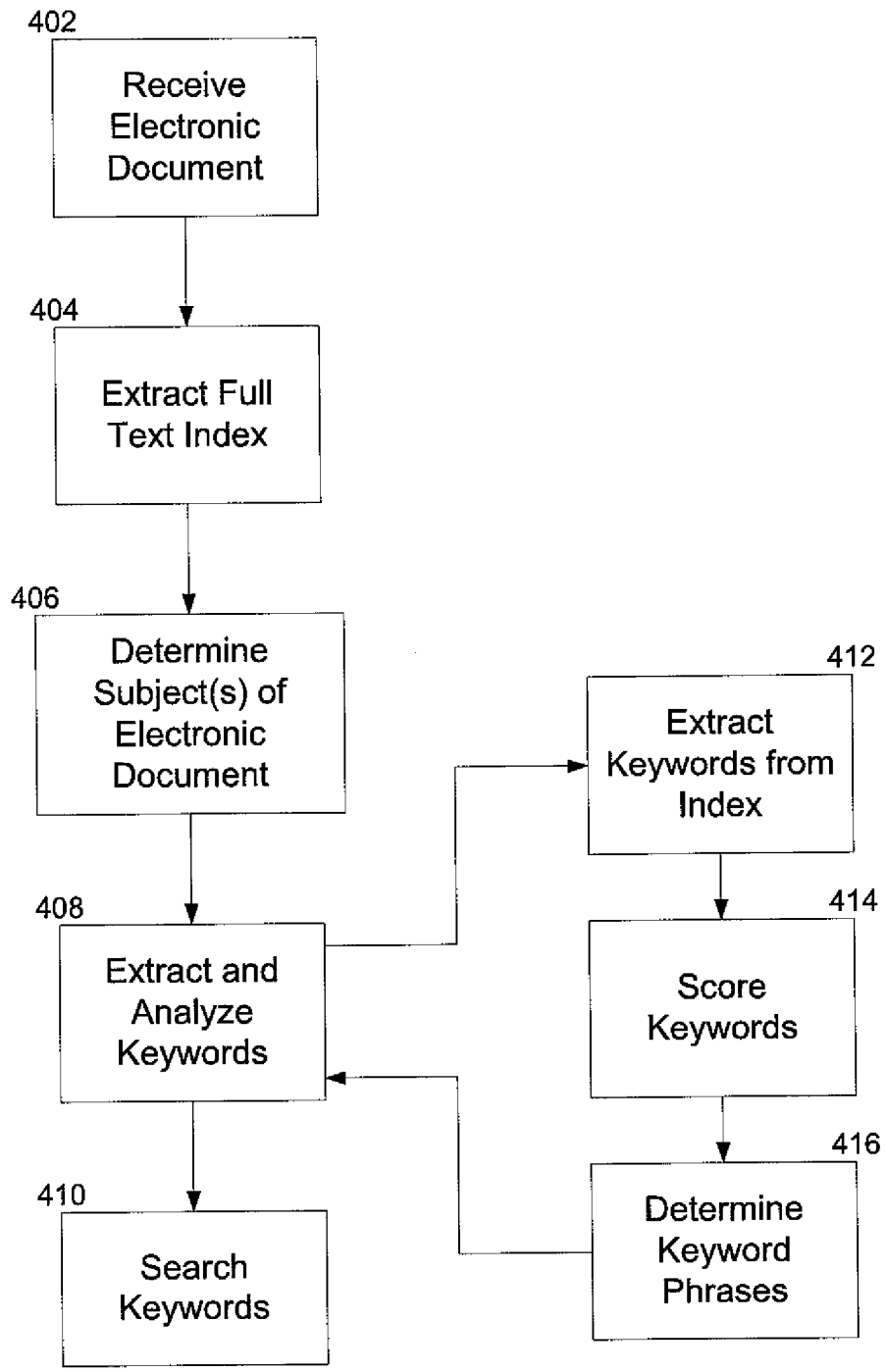
FIG. 4 depicts a flow chart illustrating a process for adding an electronic document to a digital library according to an embodiment.

FIG. 4 depicts a flow chart showing a sample process for adding a new electronic document to a library of searchable electronic documents associated with the software application. The portable computing device may receive 402 the electronic document, and a user may import the electronic document into the electronic document reader system and software application. Receiving 402 the document may include, for example, downloading the document from a web site, purchasing the document from a vendor application, receiving the document as an attachment in a mail message, and other similar types of receiving associated with a computer file. The document system may load the electronic document and extract 404 a full text index of the electronic document, along with an indicator of the position of each word in the electronic document. For example, if the electronic document is a text document, the document system may use an optical character recognition (OCR) technique to read and extract 404 individual words from the document. Additional features such as sound clips, images, videos, and other content may be extracted from the electronic document as well. Each word or content feature may be labeled with a location indicator such as an identification number indicating original position of the word or content feature in the electronic document.

The document system may scan and analyze the extracted text index, and the document system may determine 406 the subject(s) of the electronic document. The document system may use various techniques or algorithms may be used to determine 406 the subject. For example, the document system may extract and scan metadata associated with the electronic document to determine 406 the subject of the electronic document. Alternatively, if there is a synopsis of the electronic document available (e.g., if the electronic document is a novel with an available synopsis), the document system may scan and analyze the synopsis to determine 406 the subject. In another example, an electronic document may have an associated data or index file including various information related to the document such as subject and classification. The document system may scan the index file to determine 406 the subject of the electronic document.

If no metadata or synopsis is available for the electronic document, and the electronic document does not include an associated index file, the document system may scan the full text index to identify the most commonly occurring words in the electronic document and, based upon those commonly occurring words, determine 406 the subject of the electronic document. For example, the document system may access a data structure such as a database listing a number of classifications, subjects associated with each classification, and a list of keywords that commonly appear within documents related to those subjects. The individual levels of detail may be organized into searchable ontologies. For example, the document system may identify "bark," "tail," and "fetch" as commonly occurring words in the full text index. The document system may search the database and identify a number of ontologies that include at least one of the commonly occurring words. However, each of the three commonly occurring words all are within the classification "mammals" and the subject "dog." As such, based upon the database search, the document system may determine 406 the subject of the electronic document is dogs.

The document system may extract and analyze 408 one or more keyword from the full text index as well. The document system may incorporate one or more extraction and scoring techniques in order to analyze 408. FIG. 4 illustrates one example of such a technique. The document system may extract 412 one or more keywords from the full text index. Depending on the number of words in the document, the document system may use one or more extraction techniques. For example, if the electronic document has a small number of words (e.g., less than 1000), the document system may determine all the words in the electronic document are keywords, excluding the most common words in the language the electronic document is written in. For example, if the electronic document is written in English, the words "the," "and," "a," "in," "to," "be," "of," "or," and other common words may not be included in the extracted 412 keywords.

However, if the electronic document is larger and has a higher number of keywords, various criteria may be used to determine what words in the electronic document are keywords. For example, one criteria may define that a keyword must be a certain percentage of all words used in the electronic document. If an electronic document is 1500 words in length, it may only include 100-120 distinct words. Excluding common words such as those defined above, the document may only include 80-100 words. In this example, to be considered a keyword, a word may have to be at least 1% of the total words in the electronic document. Thus, to be considered a keyword, the word would have to appear at least 15 times in the document.

It should be noted that this criteria for determining a keyword is provided by way of example only. Additional sources of keywords such as lists of keywords sorted by subject and classification may be available for access and analyzing by the document system. For example, the document system may have remote access to an application programming interface (API) that includes a listing of subjects and their associated keywords.

The document system may score 414 each of the identified and extracted keywords based upon one or more scoring algorithms. For example, the document system may ignore common words such as those listed above may be ignored during extraction 412 or, if extracted, give those common words a score of zero. The document system may score 414 keywords that appear frequently in all electronic documents stored in the library associated with the software application, but are not determined to be common words, a low score such as a one (e.g., if the document system is using a numerical scoring system). The document system may score 414 keywords that appear frequently in all electronic documents related to the same subject with a higher score, e.g. a score of two assuming the same numerical scoring system as before. To determine frequency, the document system may perform one or more comparisons of each keyword against a set of thresholds established based upon an analysis of the full text indexes of related documents. Then, if the keywords satisfy the threshold, the keyword may be determined to occur frequently in related documents. For example, if an electronic document's subject is determined to be baseball, the keywords "bat," "base," "out," and other related keywords may be compared against the full text index analysis from other documents related to baseball. A rules engine may determine an occurrence threshold to determine if a word commonly occurs in related documents. For example, the rules engine may determine that a word occurring in 90% of documents related to a specific subject are common keywords for that subject. To continue the above example, the keywords "bat," "base," and "ball" are determine to occur in 100% of documents related to baseball, and thus satisfy the occurrence threshold and are given the higher score.

The document system may score keywords that are unique to a single electronic document in the library with an even higher score, e.g., a score of three using the same numerical scoring system as discussed above. To determine if a word is unique to a single electronic document, the document system may perform a similar process as that discussed above in regard to determining if a word occurs frequently in related electronic documents. For example, the Rules engine may determine that a word occurring in less than 5% of all documents is unique and that keyword may be scored accordingly.

The document system may score keywords that are common to electronic documents in the same subject, and that are unique to that subject, with an even higher score, e.g., a score of four using the same numerical scoring system as discussed above. For example, in an electronic document related to baseball, the keywords "inning," "dugout," and "homerun" may be the most commonly occurring keywords. The document system may determine, via the rules engine, that those words occur in more than 90% of books related to baseball, but in less that 5% of all electronic documents in the library. Thus, the document system may score those keywords with an even higher score. Additional scoring bonuses may be given to a keyword or keywords for matching words from a user's previous search history.

It should be noted that the words and percentages as used herein are provided by way of example only to describe a scoring system, and other sets of documents, keywords and thresholds may be used.

It should also be noted that scoring the keywords during indexing the electronic document is provided by way of example only. The individual keywords or keyword phrases may be identified and scored prior to the document system indexing the document. For example, the electronic document may include an associated index file that includes a listing of keywords and their scores. Alternatively, the document system may be operably connected to a database or other data store including a list of classifications, subjects and associated scored keywords. As the document system identifies a keyword in the full text index, the score for the keyword is extracted from the database. Additionally, a keyword's associated score may change based upon changes to the electronic document library. For example, as more documents are indexed into the library, the percentage of documents an individual word appears in may change, thereby altering the score of that keyword. As such, as the library grows to include more documents, the rules engine may adjust the percentages associated with occurrence thresholds to account for the increasing number of electronic documents.

The document system may determine 416 combinations of keywords or keyword phrases in the text index as well. Keyword phrases may be defined as a series of words including at least one keywords common in the same electronic document, as well as between electronic documents of the same subject. To continue the above example related to baseball, the keyword phrases "stolen base," "double play," "seventh inning stretch," "pitcher's mound," and other similar multi-word phrases may be determined 416 to be keyword phrases.

Once the document system has extracted and analyzed 408 the keywords from the user-selected area, the system may search 410 the keywords. FIG. 5 depicts a flow chart illustrating a sample search process. Initially, the document system receives 502 an indication of a user-selected area of interest (e.g., area 110 as shown in FIGS. 1 and 2). The document system may extract 504 various keywords and keyword phrases contained within the user-selected area. The document system may initiate a search 506 for each of the extracted keywords and keyword phrases. For example, the document system may construct a search query based upon one or more keywords extracted form the user-selected area and transmit the query to one or more search engines, online encyclopedias, article repositories, or other searchable collections of documents. Alternatively, the document system may be configured to access a search specific API associated with an online search engine or encyclopedia, and use an API interface to transmit the search to the appropriate search engine. Each individual search may produce a set of search results. Thus, for each query the document system transmits to an individual searching tool, a separate and distinct set of search results is returned. The document system may create 508 a collective list of results for each search query as received from each search tool to which the query was sent. The document system may further assign a score to each result in the collective list. The assigned score may be based upon the keyword score the search is associated with, as well as other factors such as how high the user may have ranked the results from an individual search tool. The results may include links from a search engine's results page, articles from an online encyclopedia, books, periodicals, articles, multimedia presentations, and other similar electronic documents related to the keyword or keyword phrase being searched.

Initially, each of the search results in the collective list may have the same score (or at least similar or corresponding scores) as they derive from the same keyword search. However, additional information may be used to further sort the search results. For example, a search engine may prioritize search results. This prioritization may be used to adjust the scores of the search results. This process may be used to sort individual results having the same keyword score into a ranked listing.

The document system may merge 510 each of the collective lists into a single result set. For each result item that is present in multiple collective lists, the keyword scores associated with the search queries used to identify and locate that result item are added together, thereby increasing the associated score for that individual result item. For example, if a specific article is found in the search for three individual keywords, all three keyword scores are added together to produce the article's score. The document system may sort 512 the result set based upon the scores associated with the results and output to the user in the software application. Results with the highest keyword scores may be sorted 512 to the top of the results list. Groups of results with the same score may be further sorted 512 according to other factors. For example, the position of a result in the original search engine results, the position of the keyword in the electronic document that was highlighted by the user, the number of times the keyword appears in the electronic document, whether the user has selected that result in previous searches, and other similar factors may impact the sorting of the results set.

For example the document system may rank the results via the rules engine such that the search results are filtered by overall keyword scores. Additionally, the rules engine may filter the results such that results that are associated with the subject of the electronic document are sorted to the top of the search result set, while results that are not related to the subject of the electronic document are sorted to the bottom of the search result set.

Alternatively or additionally, the document system may create multiple filtered lists based upon received user input. In this example, multiple icons may be provided for the user to select each of the available results lists. For example, one icon may display all results generated based upon an encyclopedia search, another icon may display all results generated based upon a specific search engine search, and another icon may display all results that are multimedia presentations (e.g., audio and video presentations).

The document system may output 514 the result set to the user and, in response to a user selection of at least a portion of the result set, provide the user with additional information related to the result set.

It should be noted that the search process as shown herein is shown as a linear process by way of example only. Multiple steps may be performed concurrently and in real-time to produce the result set. For example, as each list of search results is created 508, the next keyword may be searched 506 such that the result set is produced more quickly as individual steps are performed in concert. Additionally, the document system may sort 512 and output 514 an initial set of results to the user prior to the search process being completed, thus the search continues in the background without any additional input from the user while still providing the user access to both the electronic document and the initial set of results. The initial set of results may be continuously updated to include additional results until each keyword or keyword phrase has been searched 506 and sorted 512.

Depending on the programming of the software application, additional features such as usage data collection and analysis may be performed. FIG. 6 depicts a flow chart illustrating a sample process for collecting and analyzing usage data. The document system may collect 602 usage data related to a specific electronic document, including, but not limited to, a record of user-selected areas, keywords and keyword scores for words in the selected area, search results clicked on by the user, bookmarks created by the user based upon the search results, notes made by the user based upon the search results, the time a user spends on each page of the electronic document, the date and time each area is selected by a user, and other related data. The document system may send 604 the collected usage data to a central server or other centralized computing device for aggregation and storage.

The documents system, or another similar content providing system or application, may use the stored usage data to customize information delivered to the user at a later time. For example, the document system may use a user's previous search result to rank 606 additional search results such that prioritized 610 search results are presented to the user, the results having documents the user is most likely to access (regardless of score) presented first. Similarly, the document system may generate 608 a list of content recommendations and targeted advertising for the user based upon the usage data. The document system may provide 612 the content recommendations and targeted advertising to the user via the software application, or the content recommendations and targeted advertising may be provided to the user via a third party service such as an email-based advertising service.

It should be noted that the electronic documents as described herein are generally text based documents for purposes of examples only. Additional electronic documents such as sound clips, videos, multi-media presentations, and other similar electronic documents may be used accordingly. For example, a video may be present to a user via the software application. A transcript of the video, created by using speech recognition or manually user data entry, may be stored in an information table related to the video along with additional text information related to the video such as subtitles, transcripts of director's commentary, user annotations, and other text information. Additionally, timing information related to both the video and the transcript may be stored in the information table. Multiple layers of text stored within the table may correspond to the same point in time. For example, there may be subtitles, director commentary, and the transcript of the video presentation corresponding to the same point in time. During the presentation, the user may have the option to select a point on a timeline related to the video and displayed by the software application. This selection results in the software application searching for more information related to the current text corresponding to the user selected point in the video. As the user continues to view the video, keywords may be extracted from the text in real time and used to generate a live list of related content using the process as described above.

Figure 7:
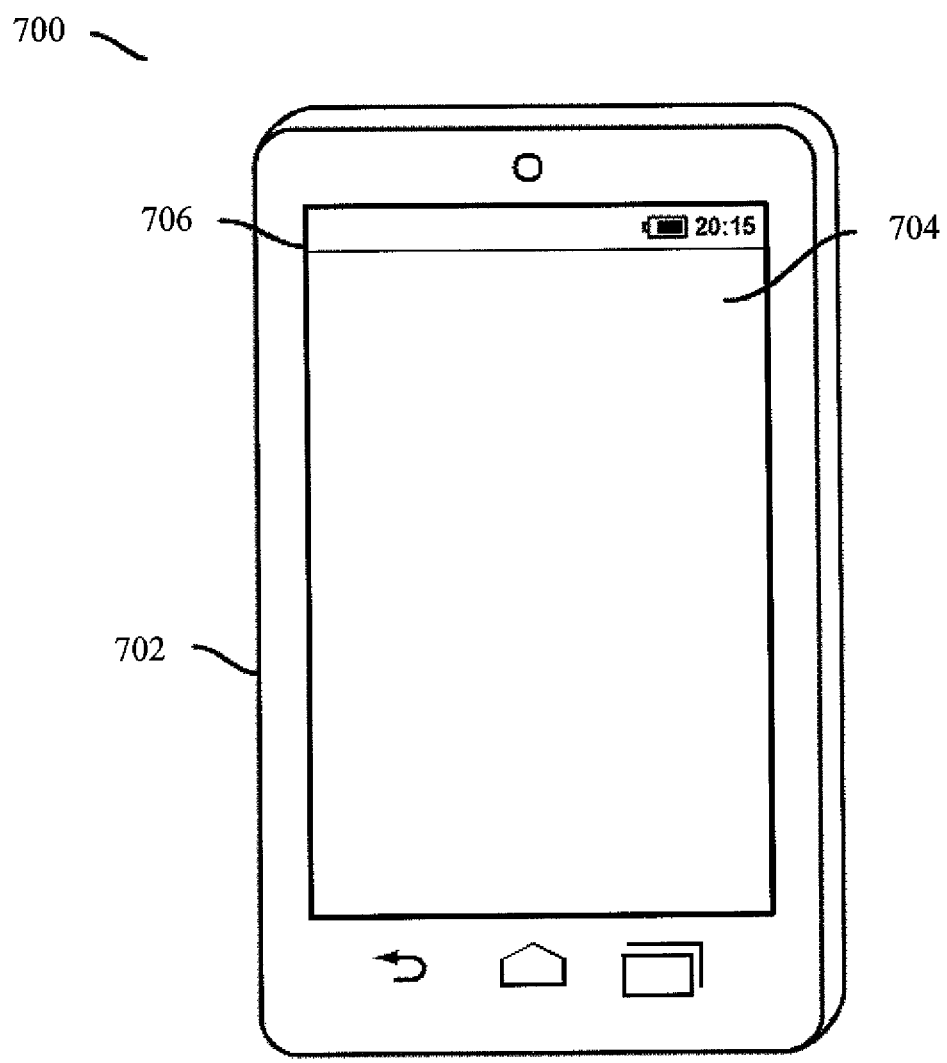
FIG. 7 depicts an example of a portable computing device.
Figure 8:
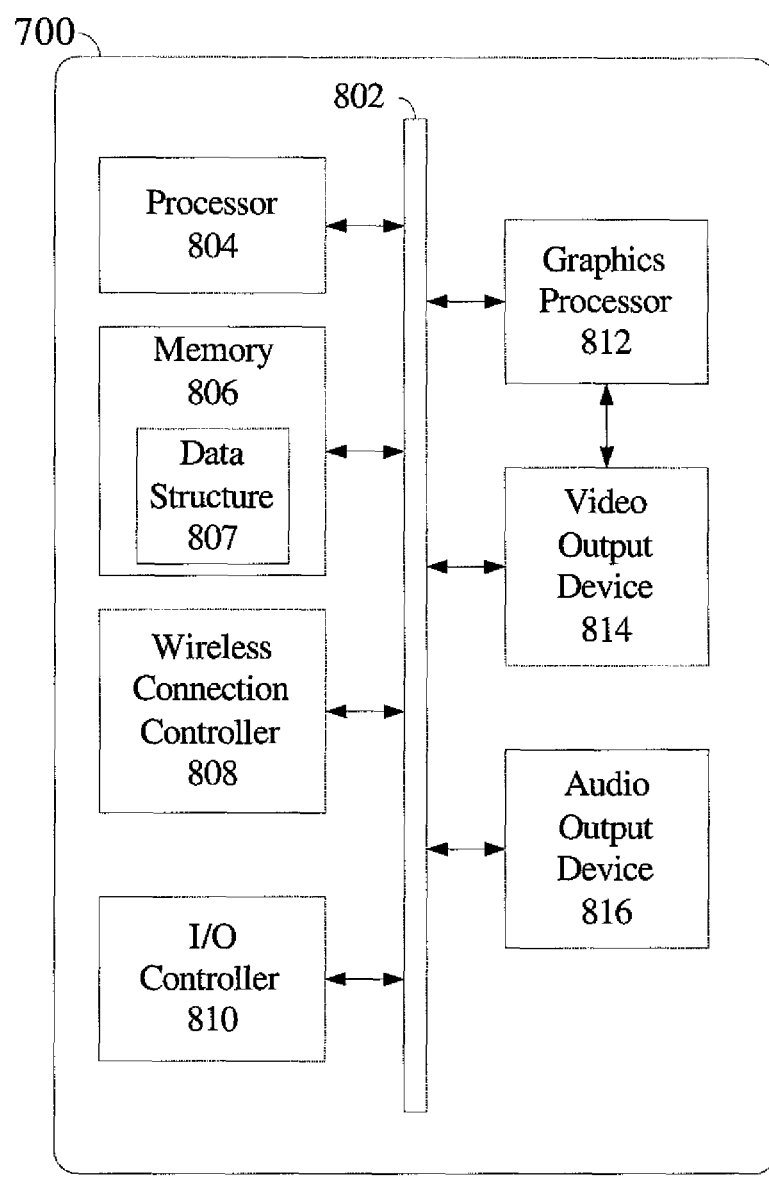
FIG. 8 depicts an example of a system diagram for a portable computing device.

FIGS. 7 and 8 illustrate an additional example of a portable computing device 700. The portable computing device 700 includes a bezel or case 702 for enclosing and protecting various operating components of the portable computing device. The portable computing device 700 further includes a combination input and display component 704. In this example, the input and display component 704 is a touch-screen configured to both receive user input as well as display information. The input and display component 704 includes one or more sensors configured to detect a touch input and, in response, generate one or more signals that may be acted upon by a processor. It should be noted, however, the input and display component 704 is shown by way of example only. The mobile device may include a keypad, track-pad, trackball, or other similar input device in combination with a display screen. The portable computing device 700 may also include a status or notification bar 706 for displaying information relevant to the current operation of the portable computing device, such as battery life, message indicators, connection strength indicators, and other similar information. Various other components such as one or more speakers, one or more cameras, one or more microphones, input ports, output ports, memory card slots, and other components may be integrated into the portable computing device 700 as well.

FIG. 8 illustrates an example of a system diagram for the portable computing device 700. Various internal components may be operably connected to a bus 802. A processing device or processor 804 may be operably connected to the bus 802. Similarly, a tangible and non-transitory computer readable medium or memory 806 may be operably connected to the bus 802 and configured to store various programming instructions to be run by the processor 804. The memory 806 may further store content items such as applications, videos, documents, audio files and similar content for processing and display/presentation on the portable computing device 700. In some alternative embodiments, the content items may be stored in a remote storage location such as a networked server or a cloud storage device and accessed by the portable computing device 700 as needed.

Additionally, the memory 806 may be configured to store the data structure 807 for storing the library of electronic documents and other related information such as keyword lists and scores for each of the electronic documents. The data structure 807 may be a database or other type of data structure configured to store organized information and provide searching and retrieval features for the information.

A wireless connection controller 808 may be operably connected to the bus 802 and configured to establish one or more wireless network connections. For example, the wireless connection controller 808 may be configured to establish a cellular telephone connection, a cellular data network connection (e.g., a 3G or 4G data connection), a wireless data network or WiFi connection (e.g., a 802.11n connection), a Bluetooth® connection, and other similar wireless connections. It should be noted that a single wireless connection controller 808 is shown by way of example only. A portable computing device may include multiple wireless connection controllers to increase throughput across multiple networks simultaneously.

An input/output (I/O) controller 810 may be operably connected to the bus 802 and configured to control various input and output devices. For example, the I/O controller 810 may be operably connected to the input and display component 704 as shown in FIG. 7. The I/O controller 810 may also be operably connected to a graphics processor 812, a video-output device 814 and an audio output device 816 via the bus 802, and configured displaying and/or presenting various images, videos, audio files, and other content to a user of the portable computing device 700 via an output device such as the input and display component 704.

It should be noted the architecture and arrangement of components as shown in FIGS. 7 and 8 are shown by way of example only to illustrate an exemplary portable computing device. Depending on the design, construction and intended purpose of the portable computing device, the type and arrangement of components may be altered. For example, if the portable computing device is a smartphone, additional components related to capturing a user's voice, converting the voice to a digital signal, and transmitting and receiving digitized voice information would be included.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A method of generating search results from an electronic document, the method comprising:
   receiving, by a library of electronic documents, an electronic document;
   extracting a full text index of the electronic document, along with an indicator of position of individual words in the electronic document;
   extracting one or more keywords in the full text index of the electronic document;
   scoring each of the extracted keywords based on the full text index; and
   by a processing device:
      retrieving the electronic document from the library,
      displaying, on a display operably connected to a processing device, the electronic document,
         receiving, by the processing device, an indication of a user-selected area of the electronic document,
      determining, by the processing device, at least one of the keywords having a position that corresponds to the user-selected area of the electronic document,
      automatically transmitting, by the processing device, the determined at least one keyword to a search engine without additional input by the user,
      receiving, by the processing device, a first results list from the search engine, wherein the first results list is from a search of one or more sources other than the library of electronic documents, and
      outputting, by the processing device, a result set along with the electronic document, wherein the result set comprises at least the first results list presented as a set of user-selectable links to additional information, and wherein outputting the result set comprises sorting the result set so that results associated with higher keyword scores are sorted to the to of the first results list.

2. The method of claim 1, wherein:
   indexing the electronic document further comprises
   analyzing the full text index to determine a subject of the electronic document; and
   outputting the result set comprises filtering the result set so that results that are associated with the subject of the electronic document are sorted to the top of the first results list.

3. The method of claim 1, further comprising collecting usage data related to the user of the electronic document.

4. The method of claim 3, wherein the usage data comprises one or more of the following:
   a record of user-selected areas, keywords and keyword scores for words in the user-selected areas, search results clicked on by the user, bookmarks created by the user based upon the search results, notes made by the user based upon the search results, a time period a user spends on each page of the electronic document, or a date and time each area is selected by a user.

5. The method of claim 1, further comprising:
   determining, by the processing device, a second keyword from the user selected portion of the electronic document;
   transmitting, by the processing device, the second keyword to the search engine;
   receiving, by the processing device, a second results list from the search engine;
   displaying, by the processing device, a merged result set along with the electronic document; wherein the merged result set comprises at least the first results list and the second results list.

6. The method of claim 1, wherein the processing device comprises one or more of the following:
   a smartphone and a tablet computing device.

7. The method of claim 1, wherein the electronic document comprises one or more of the following:
   an electronic book, a periodical, a multimedia presentation, a text document, one or more images, an electronic mail message, one or more sound clips, and one or more videos.

8. The method of claim 1, wherein:
outputting the result set comprises presenting the links as a sorted list; and
the method further comprises updating, by the processing device, the sorted list while the search engine performs a search by:
- automatically moving more relevant results of the search to the top of the sorted list, and
- automatically moving less relevant results down in the sorted list.

9. The method of claim 1, wherein extracting the one or more keywords comprises:
- determining that the electronic document has more than a threshold number of keywords; and
- reducing the keywords by only considering a word to be a keyword if it appears in the electronic document a number of times that equals or exceeds a threshold percentage of all words in the electronic document.

10. The method of claim 1, wherein scoring each of the keywords comprises:
- assigning keywords that are determined to be common words a score of zero;
- assigning high score keywords that are determined to appear with a frequency that satisfies a threshold in all electronic documents in the electronic library that relate to a common subject; and
- assigning a low score that is between zero and the high score to keywords that are not common words and that appear with a frequency that satisfies a threshold in all documents in the electronic library.

11. A system for generating search results from an electronic document, the device comprising:
- a library of electronic documents comprising, for each electronic document, a full text index of the electronic document, along with an indicator of position of individual words in the electronic document; and
- an electronic device comprising:
  - a processor;
  - a display operably connected to the processor; and
  - a non-transitory computer readable medium operably connected to the processor, the non-transitory computer readable medium containing a set of instructions configured to instruct the processor to perform the following:
    - retrieve an electronic document from the library,
    - extract one or more keywords in the full text index of the retrieved electronic document,
    - score each of the extracted keywords based on the full text index for the retrieved electronic document,
    - display the retrieved electronic document on the display,
    - receive an indication of a user-selected area of the retrieved electronic document,
    - determine at least one of the keywords having a position that corresponds to the user-selected area of the retrieved electronic document,
    - automatically transmit the determined at least one keyword to a search engine without additional input by the user,
    - receive a first results list from the search engine, wherein the first results list is from a search of one or more sources other than the library of electronic documents, and
    - output a result set along with the retrieved electronic document, wherein the result set comprises at least the first results list presented as a set of user-selectable links to additional information, and wherein outputting the result set comprises sorting the result set so that results associated with higher keyword scores are sorted to the to of the first results list.

12. The system of claim 11, wherein the instructions further comprise instructions configured to instruct the processor to perform the following:
- analyze the extracted full text index to determine a subject of the retrieved electronic document; and
- when outputting the result set, filtering the result set so that results that are associated with the subject of the retrieved electronic document are sorted to the top of the first results list.

13. The system of claim 11, wherein the set of instructions further comprises instructions configured to instruct the processor to collect usage data related to the user of the retrieved electronic document.

14. The system of claim 13, wherein the usage data comprises one or more of the following:
- a record of user-selected areas, keywords and keyword scores for words in the user-selected areas, search results clicked on by the user, bookmarks created by the user based upon the search results, notes made by the user based upon the search results, a time period a user spends on each page of the retrieved electronic document, or a date and time each area is selected by a user.

15. The system of claim 11, wherein the set of instructions further comprises instructions configured to instruct the processor to perform the following:
- determine a second keyword from the user selection of the retrieved electronic document;
- transmit the second keyword to the search engine;
- receive a second results list from the search engine; and
- display a merged result set along with the retrieved electronic document, wherein the merged result set comprises at least the first results list and the second results list.

16. The system of claim 11, wherein the device comprises one or more of the following:
- a smartphone or a tablet computing device.

17. The system of claim 11, wherein the electronic document comprises one or more of the following:
- an electronic book, a periodical, a multimedia presentation, a text document, one or more images, an electronic mail message, one or more sound clips, or one or more videos.

18. The system of claim 11, wherein:
the instructions to output the result set comprise instructions to present the links as a sorted list; and
the non-transitory computer readable medium contains additional instructions configured to instruct the processor to update the sorted list while the search engine performs a search by:
- automatically moving more relevant results of the search to the top of the sorted list, and
- automatically moving less relevant results down in the sorted list.

19. The system of claim 11, wherein the instructions to extract the one or more keywords comprise instructions to:
- upon determining that the retrieved electronic document has more than a threshold number of keywords, reduce the keywords by only considering a word to be a keyword if it appears in the electronic document a number of times that equals or exceeds a threshold percentage of all words in the retrieved electronic document.

20. The system of claim 11, wherein the instructions to score each of the keywords comprise instructions to:

assign keywords that are determined to be common words a score of zero;

assign high score keywords that are determined to appear with a frequency that satisfies a threshold in all electronic documents in the electronic library that relate to a common subject; and assign a low score that is between zero and the high score to keywords that are not common words and that appear with a frequency that satisfies a threshold in all documents in the electronic library.

\* \* \* \* \*